United States Patent [19]

King

[11] Patent Number: 4,793,244

[45] Date of Patent: Dec. 27, 1988

[54] VENTILATION DEVICE FOR FOOD DISPENSING MACHINE

[75] Inventor: Alan M. King, Westmont, Canada

[73] Assignee: Vendking International Ltee, St. Hubert, Canada

[21] Appl. No.: 119,728

[22] Filed: Nov. 12, 1987

[51] Int. Cl.$^4$ .............................................. A47J 31/00
[52] U.S. Cl. ...................... 99/285; 222/190
[58] Field of Search ............ 99/279, 275, 285, 289 R, 99/467, 472, 473, 474, 475, 476; 222/190; 426/433

[56] References Cited

U.S. PATENT DOCUMENTS

| | | | |
|---|---|---|---|
| 1,995,551 | 3/1935 | Shodron | 99/476 |
| 2,517,073 | 8/1950 | Alvarez | 99/289 |
| 2,907,265 | 10/1959 | Bastian | 99/275 |
| 2,931,288 | 4/1960 | Totten | 99/289 |
| 2,939,614 | 6/1960 | Hill | 220/190 |
| 3,001,420 | 12/1961 | Mueller | 99/283 |
| 3,084,613 | 4/1963 | Maxson | 99/289 |
| 3,552,976 | 1/1971 | King | 99/283 |
| 3,739,709 | 6/1973 | Herbsthofer et al. | 99/289 |

Primary Examiner—Robert W. Jenkins
Attorney, Agent, or Firm—Samuel Meerkreebs

[57] ABSTRACT

A coffee brewing machine includes a housing having a front wall, a viewing window provided on the front wall, and a coffee brewing compartment adjacent the window in the front wall. The coffee brewing compartment includes a pouring assembly in a pour area. The elongated duct extends along an edge of the window and adjacent the brewing compartment. The duct has an inlet opening adjacent the pour area and inlet openings adjacent the windows. A vacuum pump is provided at the other end of the duct, and an exhaust opening is provided in a wall of the housing communicating with the duct and vacuum pump so that vapors being formed in the brewing compartment and the pour area as well as the window are withdrawn by negative pressure through the duct and exhausted outboard of the coffee brewing machine.

3 Claims, 1 Drawing Sheet

U.S. Patent    Dec. 27, 1988    4,793,244
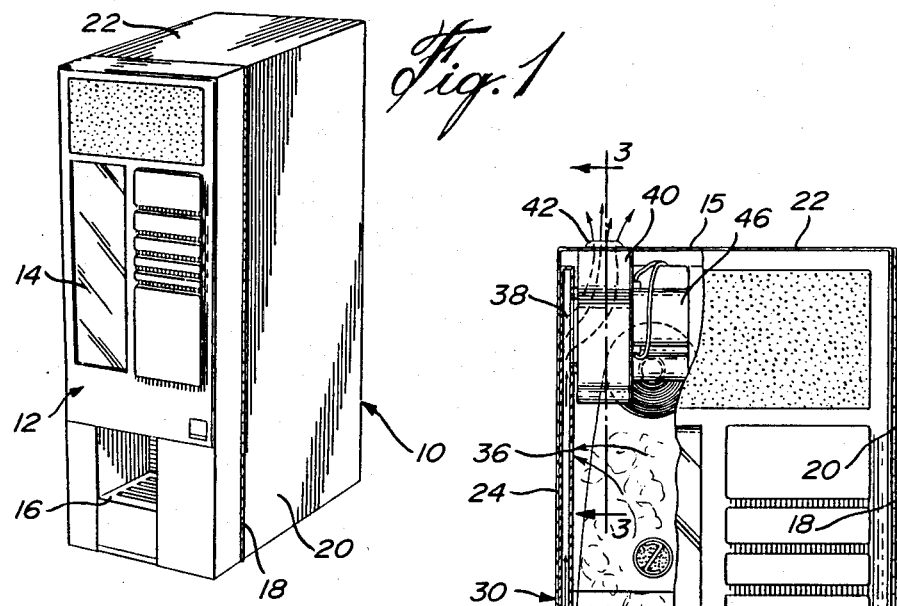
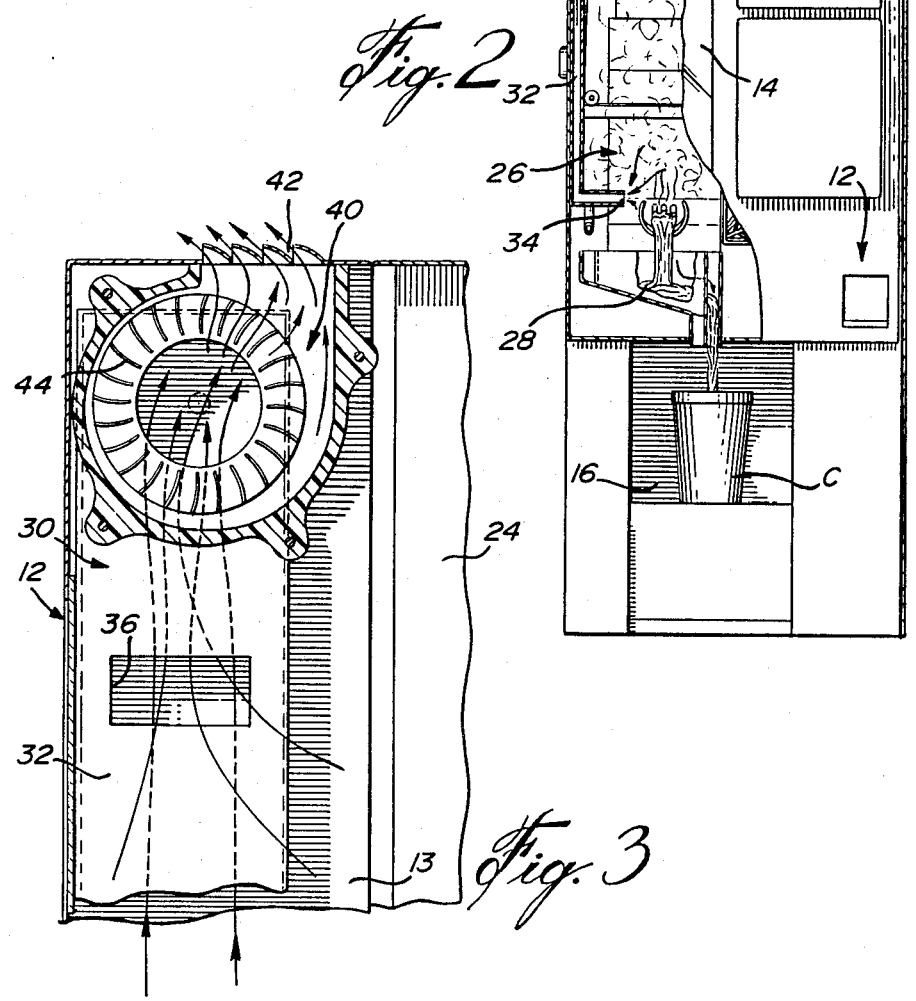

VENTILATION DEVICE FOR FOOD DISPENSING MACHINE

BACKGROUND OF THE INVENTION

1. Field of the Invention

The present invention relates to food dispensing machines, and more particularly, to a hot beverage dispensing machine.

2. Description of the Prior Art

Self-service food dispensing machines are usually characterized by being enclosed in a display housing. In some cases, a glass panel or window may be provided to allow persons utilizing the machine to view the mechanical operations going on during the dispensing of such food. The handling of hot beverages, particularly, creates vapors which form above the surface of the hot beverage. If the housing is provided with a window, it will tend to fog up, making it impossible to view the interior of the housing through the window. Furthermore, the presence of such vapors within the housing may provide a high humidity within the housing, causing rust and other problems associated with high humidity.

It is known to place fans in enclosed housings of this type, such as described in U.S. Pat. Nos. 2,517,073, Alvarez, 1950, and 2,907,265, SeBastian, 1959. These patents describe very specific uses of fans or blowers, such as for ventilating the gas burner in the Alvarez patent or the shielding of an opening as in SeBastian.

SUMMARY OF THE INVENTION

It is an aim of the present invention to provide an improved ventilation unit for use in a hot food dispensing machine for removing vapors therefrom.

It is a further aim of the present invention to provide a ventilation unit in a hot food dispensing machine to exhaust vapors in specific areas, such as a window in the housing in order to keep it clear for viewing.

A construction in accordance with the present invention comprises a ventilation unit for a food dispensing machine. The food dispensing machine includes a housing wall adjacent the dispensing area. The ventilation unit includes an elongated duct mounted on the housing wall and exhaust openings provided at spaced-apart locations on the duct. The duct comprises an exit opening and a negative pressure means for providing a suction in the duct to thereby draw vapors from the areas adjacent the openings in the duct and exhausting the vapors outboard of the dispensing machine.

In a more specific embodiment, a window is provided in the housing wall, and the elongated duct extends, in part, along an edge of the window. Exhaust openings in the duct are provided adjacent the window so as to draw vapors from the area of the window in order to reduce fogging thereon.

More specifically, the duct may be provided with an inlet opening near the pour area in a hot beverage dispensing machine.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a perspective view of a typical coffee dispensing machine having a window on the front thereof;

FIG. 2 is a front elevation, partly in cross-section, of the coffee dispensing machine as shown in FIG. 1; and FIG. 3 is a vertical cross-section, taken along line 3—3 of FIG. 2, illustrating a detail thereof.

DESCRIPTION OF THE PREFERRED EMBODIMENTS

Referring now to the drawings, a coffee brewing and dispensing machine of the type described and illustrated in U.S. Pat. No. 3,552,976 is shown in FIG. 1 having a housing 10 with a front wall 12. A viewing window 14 is provided on the front wall 12. The viewing window 14 allows one to view the brewing operation while the customer waits for the cup C in cup receptacle 16 to be filled.

The front wall 12 includes side panels 13 and 15. Part of the apparatus, such as a coin-handling apparatus (not shown) is mounted to the front wall 12 which is hinged to the side wall 20 by means of a piano hinge 18. The housing 10 also includes a top wall 22 and a side wall 24. Within the housing 10 is provided a brewer compartment 26 which is schematically shown in FIG. 2 and which includes a pour spout 28 adapted to convey the dispensed coffee into the cup C. Also mounted within the front wall 12 is a ventilation unit 30.

As shown in FIGS. 2 and 3, the ventilation unit 30 includes an elongated flat duct 32 mounted on side panel 13 (part of front wall 12). As shown in FIG. 2, the duct 32 extends from the pour spout area 28 of the brewer compartment to the top of the front wall 12 where there is mounted a vacuum pump 40. The duct has an inlet opening 34 adjacent the pour spout 28. An opening 36 is located adjacent the window 14 in the front wall 12. Other openings may be provided as necessary along the length of the duct 32. An outlet opening 38 is provided at the upper end of the duct 32 and communicates with the vacuum pump 40.

The vacuum pump 40 includes, as shown in FIG. 3, a pump impeller 44, and the pump communicates with an exhaust outlet 42 in the top panel 17 of the front wall 12.

In operation, the brewer compartment 26 is operated to pour a hot liquid, such as coffee, just below the boiling point of the liquid. Visible vapors are thus produced which would normally fog up the window 14 and also contribute to a high level of humidity within the housing. The purpose of the ventilation unit 30 is to draw such vapors immediately as they are formed from the pour area by means of inlet opening 34. Other openings, such as opening 36, may be provided adjacent the window 14 in order to exhaust any vapors which might otherwise cause fogging on the window 14. The pump 40 and its electric motor 46 would be chosen of sufficient magnitude to cause a vacuum in the duct 32 to thereby draw the vapors therein as they are being formed. These vapors are exhausted through the exhaust outlet 42 by the impeller 44 at the top of the housing 10.

I claim:

1. In a food dispensing machine which includes a housing wall adjacent the dispensing area, a ventilation unit comprising an elongated closed duct mounted on the housing wall and exhaust openings provided at spaced-apart locations on the duct, the duct comprising an exit opening and a negative pressure means for providing a suction in the duct to thereby draw vapors from the areas adjacent the openings in the duct and exhausting the vapors outboard of the dispensing machine; wherein a window is provided in the housing wall and the elongated duct extends in part along an edge of the window, and exhaust openings are provided in the duct adjacent the window so as to draw vapors from the area of the window in order to reduce fogging thereon.

2. In a food dispensing unit as defined in claim 1, wherein the machine dispenses hot beverage and includes a pouring means in a pour area, and the duct extends to the pour area and includes an inlet opening adjacent the pour area for drawing vapors being formed at the pour area.

3. In a food dispensing machine which includes a housing wall adjacent the dispensing area, a ventilation unit comprising an elongated closed duct mounted on the housing wall and exhaust openings provided at spaced-apart locations on the duct, the duct comprising an exit opening and a negative pressure means for providing a suction in the duct to thereby draw vapors from the areas adjacent the openings in the duct and exhausting the vapors outboard of the dispensing machine; wherein the foods dispensing machine is a coffee brewing machine including a housing having a front wall, a viewing window provided on the front wall, a coffee brewing compartment adjacent the window in the front wall; the coffee brewing compartment including a pouring assembly in a pour area, the elongated duct extending along an edge of the window and adjacent the brewing compartment, the duct having an inlet opening adjacent the pour area and inlet openings adjacent the window, a vacuum pump provided at the other end of the duct and an exhaust opening provided in a wall of the housing communicating with said duct and vacuum pump so that vapors being formed in the brewing compartment and the pour area as well as the window are withdrawn by negative pressure through said duct and exhausted outboard of the coffee brewing machine.

* * * * *